(12) United States Patent
Han et al.

(10) Patent No.: US 6,417,505 B1
(45) Date of Patent: Jul. 9, 2002

(54) NEAR-FIELD OPTICAL HETERODYNE MEASUREMENT SYSTEM USING NEAR-FIELD FIBER-OPTIC PROBE

(75) Inventors: Seok Kil Han; Kwang Yong Kang; Sang Dong Jung, all of Taejon (KR); Herold R. Fettemam, Los Angeles, CA (US)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/497,134

(22) Filed: Feb. 3, 2000

(30) Foreign Application Priority Data

Jun. 7, 1999 (KR) ............................................. 99-27011

(51) Int. Cl.[7] .............................. H01J 3/14; H01J 5/16; H01J 40/14
(52) U.S. Cl. ..................................... 250/216; 250/201.3
(58) Field of Search .............................. 250/216, 201.3, 250/306, 307

(56) References Cited

U.S. PATENT DOCUMENTS 5,371,588 A * 12/1994 Davis et al. ................. 356/349

OTHER PUBLICATIONS

Humphreys et al., "High accuracy frequency response measurements of mm–wave photodiodes using a DFB heterodyne system with a novel detection scheme," Optical Detectors—IEEE Colloquium 1990 (Conference).*

Kazovsky, et al. ,"560 Mb/s Optical PSK Synchronous Heterodyne Experiment," IEEE Photonics Technology Letters vol.2, No. 6, Jun. 1990.*

Tan et al., "Calibration of Optical Receivers and Modulators Using an Optical Heterodyne Technique," Nicrowave Symposium Digest (1988) IEEE MTT–S International (1988) pp. 1067–1070 vol. 2 (Conference).*

Bhattacharya, et al.; The optical Response of Eiptaxial Lift–Off HEMT's to 140 Ghz; IEEE Journal of Quantum Electronics. vol. 33, No. 9, Sep. 1997, pp. 1507–1516.

Bhattacharya, et al.; Optical Mixing to 211 Ghz using 50 nm gate pseudomorphic high electron mobility transistors; Appl. Phys. Lett. 72 (4), Jan. 26, 1998; pp. 398–400.

S.K. Han, et al.; Demonstration of the high–frequency optical herodyne technology using near–filed fiber–optic probes; Applied Physics Letters; vol. 75, No. 4, Jul. 26, 1999; pp. 454–456.

* cited by examiner

Primary Examiner—Robert H. Kim
Assistant Examiner—Courtney Thomas
(74) Attorney, Agent, or Firm—Jacobson Holman, PLLC

(57) ABSTRACT

A near-field optical heterodyne measurement system for measuring characteristic of high-frequency and high-speed devices includes a combining unit for combining two optical beams to produce a submicron-size optical beam, wherein the two optical beams have different frequency from each other, a near-field fiber-optic probe for injecting the submicron-size optical beam into a sample device to be measured, a position controlling unit for controlling a position of the near-field fiber-optic probe, and a measuring unit for receiving a millimeter wave exited from the sample device to measure characteristics of the sample device.

9 Claims, 2 Drawing Sheets

NEAR-FIELD OPTICAL HETERODYNE MEASUREMENT SYSTEM USING NEAR-FIELD FIBER-OPTIC PROBE

FIELD OF THE INVENTION

The present invention is an measurement system; and, more particularly, to a near-field optical heterodyne measurement system using a near-field fiber-optic probe, by using which characteristics of high-speed and high-frequency devices such as HBT and PHEMT can be measured with a high resolution and a low noise.

DESCRIPTION OF THE PRIOR STATE OF THE ART

Near-field fiber-optic probes have attracted a great deal of current interest mainly due to their ability to extend optical microscopy beyond the classical diffraction limit. Scanning optical microscopes using these probes have yielded very high resolution in imaging and spectroscopic applications at visible and infrared wavelengths. The technology has been applied to imaging in biology material science, surface chemistry and information storage.

In conventional research on an optical heterodyne technique, micro- and millimeter waves can be generated by the injection of a laser beam into a high-speed and high-frequency semiconductor element through a lens or a single mode optical fiber. In this case, however, a diameter of the laser beam is much larger than that of the semiconductor element, thereby degrading a stability of a detected signal and resulting in a high noise figure.

SUMMARY OF INVENTION

It is, therefore, an object of the present invention to provide a near-field optical heterodyne measurement system using a near-field fiber-optic probe, by which characteristics of high-speed and high-frequency devices such as HBT and PHEMT can be measured with a high resolution in imaging and a low noise.

In accordance with an aspect of the present invention, there is provided a near-field optical heterodyne measurement system for measuring characteristic of high-frequency and high-speed devices, comprising: a combining means for combining two optical beams to produce a submicron-size optical beam, wherein the two optical beams have different frequency from each other; a near-field fiber-optic probe for injecting the submicron-size optical beam into a sample device to be measured; a position controlling means for controlling a position of the near-field fiber-optic probe; and a analyzing means for receiving a millimeter wave exited from the sample device to measure characteristics of the sample device.

The combining means includes: a first laser for producing a first optical beam; a second laser for producing a second optical beam; and a fiber coupler for combining the first optical beam with the second optical beam.

The near-field fiber-optic probe includes: a waveguide for transmitting the combined optical beam from the fiber coupler; a tip, whose diameter is less than that of a wavelength of incident light; and a taper region for connecting the waveguide with the tip.

The position controlling means includes: a microscope objective for controlling a position of the near-field fiber-optic probe and the sample device; a feedback controller for setting a reference position to control a distance between the near-field fiber-optic probe and the sample device to be measured; a positioning controller for placing the near-field fiber-optic probe within a predetermined distance from a surface of the sample device to be measured; a function generator for setting a reference frequency and controlling a resonance frequency; a lock-in amplifier for measuring AC signal which is generated when the distance between the near-field fiber-optic probe and the sample device is changed; a fine vibrator, coupled to the near-field fiber-optic probe, for vibrating the near-field fiber-optic probe; a helium-neon laser for generating a laser light to control the distance between the near-field fiber-optic fiber and the sample device; and a photodiode for sensing the laser light generated from the helium-neon laser to control a distance between the near-field fiber-optic probe and the device to be measured.

Further, the measuring means includes: a fine probe for detecting the millimeter wave exited from the sample device to be measured; a local oscillator for producing a reference frequency; a mixer for mixing the reference frequency from the local oscillator with the millimeter wave to generate an intermediate frequency; a spectrum analyzer for measuring the intermediate frequency; and a parameter analyzer for analyzing parameter including a DC photocurrent to measuring device characteristics.

BRIEF DESCRIPTION OF THE DRAWING

Other objects and aspects of the invention will become apparent from the following description of the embodiments with reference to the accompanying drawings, in which.

DETAILED DESCRIPTION OF THE PREFERRED EMBODIMENTS

Figure 1:
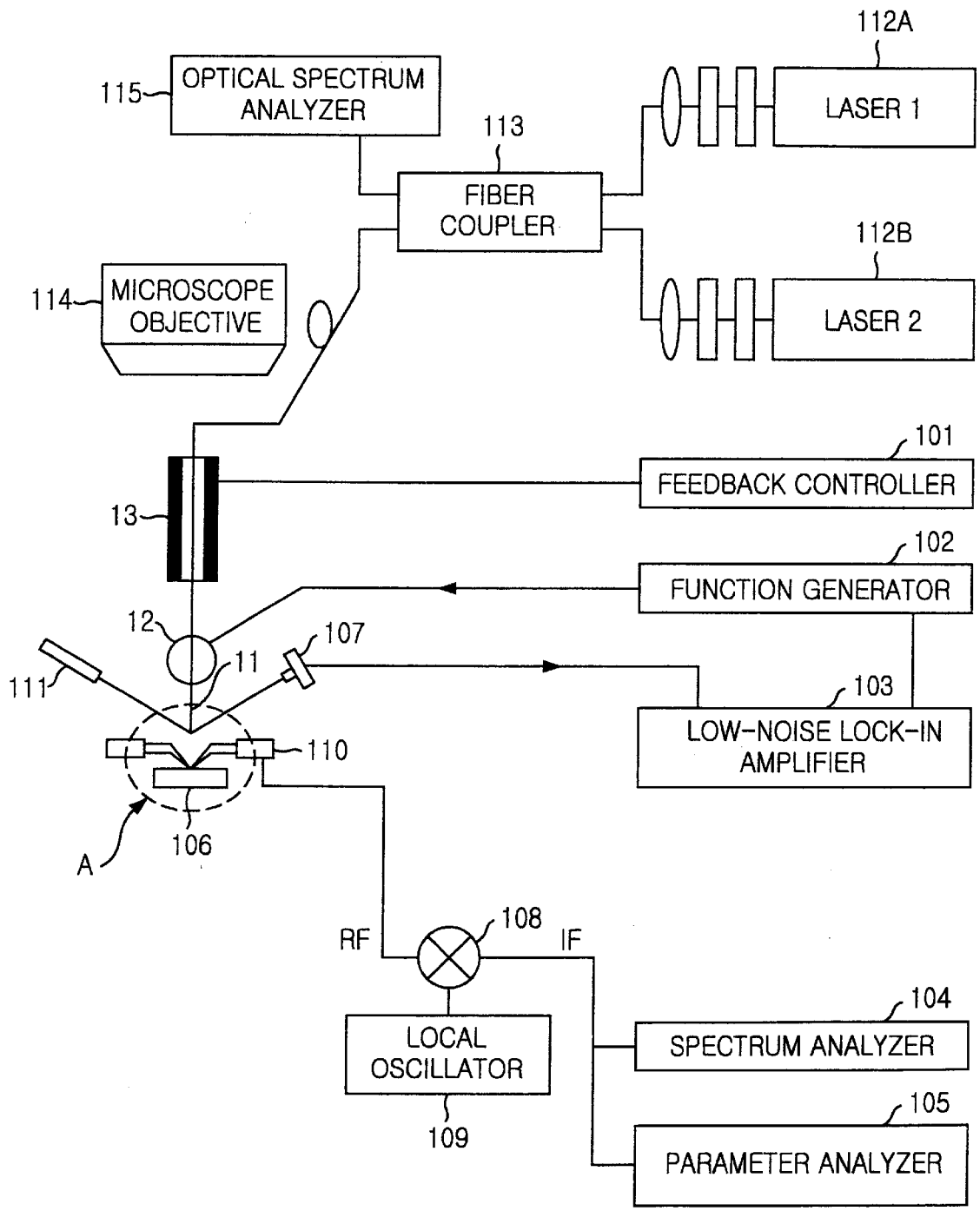
FIG. 1 is a schematic diagram of a near-field optical heterodyne measurement system in accordance with the present invention.

FIG. 1 is a schematic diagram illustrating a near-field optical heterodyne measurement system using a near-field fiber-optic probe.

Referring to FIG. 1, the near-field optical heterodyne measurement system includes a combining unit for combining two optical beams to producing a combined optical beam, a near-field fiber-optic probe for injecting a submicron-size optical beam used to excite a small portion of an active region of the sample device, a position controlling unit for controlling a position of the near-field fiber-optic probe and the sample device to be measured, and a measuring unit for receiving a millimeter wave exited from the sample device to measure characteristics of the sample device.

In the combining unit, a first laser 112A and a second laser 112B produce a first optical beam and a second optical beam, respectively, wherein the difference frequency between the two optical beams can be tuned up to 10 THz. A 2×2 fiber coupler 113 combines the two optical beams to generate a submicron-size optical beam. One output of the 2×2 fiber coupler 113 is fed to an optical spectrum analyzer 115 monitoring a optical power and a difference frequency thereof, and the other output is coupled to the near-field fiber-optic probe 11.

In the position controlling unit, a feedback controller 101 sets a reference position to control a distance between the near-field fiber-optic probe 11 and the sample device, e.g., high-speed and high-frequency device such as heterojunction bipolar transistors (HBTs) and psuedomorphic high electron mobility transistors (PHEMTs), by using a function generator 102 and a low-noise lock-in amplifier 103. Hereinafter, the distance between the near-field fiber-optic probe and the sample device to be measured is referred to as a sample-probe distance. The function generator 102 sets a reference frequency and controls a resonance frequency. The low-noise lock-in amplifier 103 carries out a measurement of AC signals generated when the sample-probe distance is changed. A fine vibrator 12 formed with a piezoelectric material such as PZT is coupled to the near-field fiber-optic probe 11 to thereby vibrate the near-field fiber-optic probe 11. Here, each position of the near-field fiber-optic probe 11 and the fine vibrator 12 is controlled by the positioning controller 13. After setting a resonance frequency by using the reference position and the sample-probe distance, a photodiode 107 measures an optical-modulated signal from a Helium-Neon laser 111 and the low-noise lock-in amplifier 103 measures the signal generated from the photodiode 107. The Helium-Neon laser 111 controlling the sample-probe distance generates a laser light. The photodiode 107 acts as a sensor for measuring the laser light from the Helium-Neon laser 111 to control the sample-probe distance. Through these procedures, the sample-probe distance can be maintained constantly. Additionally, the microscope objective 114 roughly controls a position of the sample device and the fiber-optic probe. Here, it should be noted that the microscope objective 114 controls the position, not the sample-probe distance.

The near-field fiber-optic probe 11 is brought in close proximity to the sample device 106 using a high-precision computer-controlled positioning controller 13, so-called XYZ actuator positioner. The positioning controller 13 allows the near-field fiber-optic probe 11 to be placed within a distance of approximately 0.1 $\mu$m from the surface of the sample device 106.

The near-field fiber-optic probe 11 produces a submicron-size optical beam, which is used to excite a small local area of the sample device's active region, and has a minimum resolution of 20 nm.

In the measuring unit, when the submicron-size optical beam from the near-field fiber-optic probe 11 is injected into the sample device 106 and therefore, a millimeter wave is generated. The mixer 108 mixes the optically generated millimeter wave from the sample device with a reference frequency from the local oscillator 109 to thereby output an intermediate frequency (IF). The output of the mixer 108 is coupled to a spectrum analyzer 104 for measuring the IF signal and the parameter analyzer 105 for analyzing parameters such as DC photocurrent to measure device characteristics.

Figure 2:
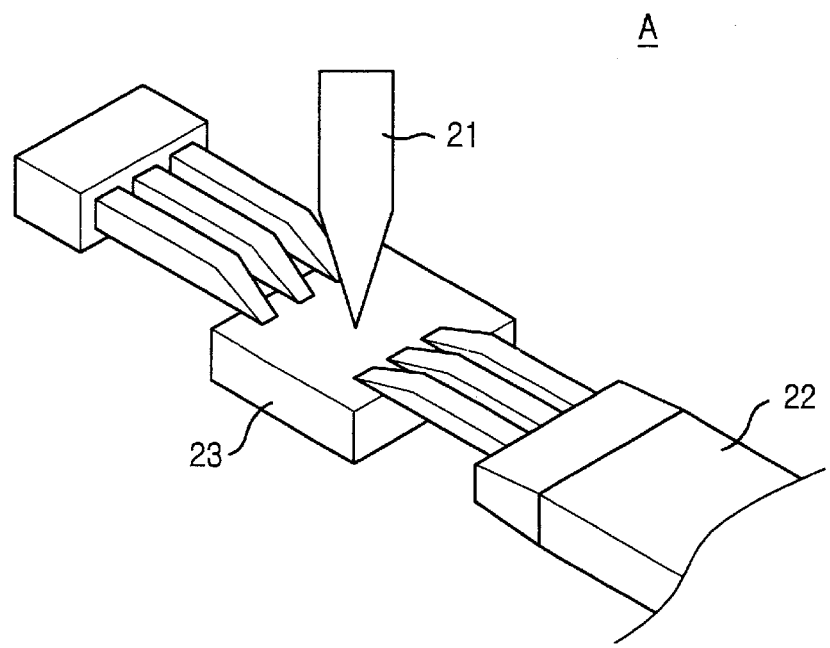
FIG. 2 is an enlarged diagram of section A shown in FIG. 1.

FIG. 2 is an enlarged diagram of section A shown in FIG. 1. A reference numeral 21 indicates the near-field fiber-optic probe, 22 a fine probe of coplanar type and 23 a sample device to be measured.

The near-field fiber-optic probe 21 is coupled to the computer-controlled positioning controller 13. The positioning controller 13 allows a precise displacement of the fiber-optic probe within approximately 0.1 $\mu$m from the sample device using a shear force feedback principle.

The combined optical power $P_t$ exiting the end of the near-field fiber-optic probe can be written as:

$$P_t = P_1 + P_2 + 2\sqrt{P_1 P_2} \cos(\omega_1 - \omega_2)t = P_{dc} + P_{ac} \quad \text{(Eq.1)}$$

where, $P_1$ is an average power of the optical beam having an angular frequency of $\omega_1$, and $P_2$ is an average power of the optical beam having an angular frequency of $\omega_2$.

The photocurrent $I_P(t)$ excited in the sample device can be expressed as:

$$I_P(t) = \frac{q}{h\nu}\eta P_t = \frac{q}{h\nu}\eta[P_1 + P_2 + 2\sqrt{P_1 P_2}\cos(\omega_1 - \omega_2)t] \quad \text{(Eq.2)}$$
$$= \frac{q}{h\nu}(\eta_{DC} P_{DC} + \eta_{AC} P_{AC}) = I_{DC} + I_{AC}$$

where, q is an electron charge, v is a frequency of the incident light, and $\eta_{DC}$ and $\eta_{AC}$ are external quantum efficiencies corresponding to DC and AC optical excitation, respectively. The efficiency factors include any optical gain mechanism present in the device, and are a function of an illumination spot location among other parameters. The DC photocurrent $I_{DC}$ is measured by the parameter analyzer. As can be seen from Eq. 2, the output power $P_t$ of the incident light having a difference frequency ($\omega_1-\omega_2$) is proportional to $(P_1 P_2)^{1/2}$.

Figure 3:
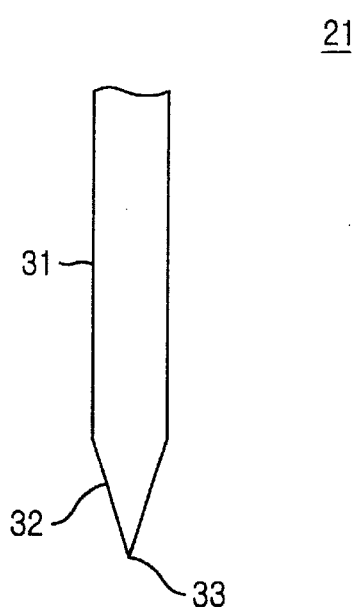
FIG. 3 is a detailed diagram of a near-field fiber-optic probe shown in FIG. 2.

FIG. 3 is a detailed diagram of a near-field fiber-optic probe shown in FIG. 2. The near-field fiber-optic probe includes a waveguide 31 for transmitting the optical beam without any loss, a tip 33 whose diameter is much less than that of a wavelength of incident light, e.g., 0.05 $\mu$m to 0.1 $\mu$m, and a taper region 32 for connecting the waveguide 31 with the tip 33.

The near-field fiber-optic probe is fabricated from an optical core by tapering it down to a sub-wavelength-size aperture. For the fabrication of the probe, a heating-pulling process is employed which involves simultaneous heating and pulling of the optical fiber in a controlled manner. It should be noted that a typical near-field fiber-optic probe has a tip diameter of approximately 50 nm. The probe tip according to the present invention is intentionally made larger to ensure larger optical throughput and better focusing, which is important to obtain good mixing signals and responses. The throughput efficiency of the fiber-optic probe is measured to be approximately $10^{-3}$ at 1550 nm.

Using the near-field fiber-optic probe, transmittance characteristic in extremely low temperature as well as high-speed devices' high-frequency bandwidth characteristic reaching several GHz can be measured, wherein the high-speed devices use micro- or millimeter waves.

While the present invention has been described with respect to certain preferred embodiments only, other modifications and variation may be made without departing from the spirit and scope of the present invention as set forth in the following claims.

What is claimed is:

1. A near-field optical heterodyne measurement system for measuring characteristic of high-frequency and high-speed devices, comprising:

combining means for combining two optical beams to produce a submicron-size optical beam, wherein the two optical beams have difference frequencies from each other;

a near-field fiber-optic probe for injecting the submicron-size optical beam into a sample device to be measured;

a position controlling means for controlling a position of the near-field fiber-optic probe; and a measuring means for receiving a millimeter wave exited from the sample device to measure characteristics of the sample device.

2. The near-field optical heterodyne measurement system as recited in claim 1, wherein the combining means includes:

a first laser for producing a first optical beam;

a second laser for producing a second optical beam; and a fiber coupler for combining the first optical beam with the second optical beam.

3. The near-field optical heterodyne measurement system as recited in claim 2, further including:

an optical spectrum analyzer, coupled to the fiber coupler, for monitoring an optical power and a difference frequency between the first optical beam and the second beam.

4. The near-field optical heterodyne measurement system as recited in claim 1, wherein the near-field fiber-optic probe includes:

a waveguide for transmitting the combined optical beam from the fiber coupler;

a tip, whose diameter is less than that of a wavelength of incident light; and a taper region for connecting the waveguide with the tip.

5. The near-field optical heterodyne measurement system as recited in claim 4, wherein the tip has a diameter in a range of 0.05 $\mu$m to 0.1 $\mu$m.

6. The near-field optical heterodyne measurement system as recited in claim 1, wherein the position controlling means includes:

a microscope objective for controlling a position of the near-field fiber-optic probe and the sample device;

a feedback controller for setting a reference position to control a distance between the near-field fiber-optic probe and the sample device to be measured;

a positioning controller for placing the near-field fiber-optic probe within a predetermined distance from a surface of the sample device to be measured;

a function generator for setting a reference frequency and controlling a resonance frequency;

a lock-in amplifier for measuring AC signal which is generated when the distance between the near-field fiber-optic probe and the sample device is changed;

a fine vibrator, coupled to the near-field fiber-optic probe, for vibrating the near-field fiber-optic probe;

a helium-neon laser for generating a laser light to control the distance between the near-field fiber-optic fiber and the sample device; and a photodiode for sensing the laser light generated from the helium-neon laser to control a distance between the near-field fiber-optic probe and the device to be measured.

7. The near-field optical heterodyne measurement system as recited in claim 1, wherein the measuring means includes:

a fine probe for detecting the millimeter wave exited from the sample device to be measured;

a local oscillator for producing a reference frequency;

a mixer for mixing the reference frequency from the local oscillator with the millimeter wave to generate an intermediate frequency;

a spectrum analyzer for measuring the intermediate frequency; and a parameter analyzer for analyzing parameter including a DC photocurrent to measure device characteristics.

8. The apparatus as recited in claim 1, wherein a combined optical power exiting the end of the near-field fiber-optic is given as follows:

$$P_t = P_1 + P_2 + 2\sqrt{P_1 P_2}\cos(\omega_1 - \omega_2)t = P_{dc} P_{ac}$$

where, $P_1$ is an average power of the first optical beam having an angular frequency of $\omega_1$, and $P_2$ is an average power of the second optical beam having an angular frequency of $\omega_2$; and wherein a photocurrent excited in the sample device to be measured is given as follows:

$$I_P(t) = \frac{q}{h\nu}\eta P_t = \frac{q}{h\nu}\eta\left[P_1 + P_2 + 2\sqrt{P_1 P_2}\cos(\omega_1 - \omega_2)t\right]$$
$$= \frac{q}{h\nu}(\eta_{DC} P_{DC} + \eta_{AC} P_{AC}) = I_{DC} + I_{AC}$$

where, q is an electron charge, v is a frequency of the incident light, and $\eta_{DC}$ and $\eta_{AC}$ are external quantum efficiencies corresponding to DC and AC optical excitation, respectively.

9. The near-field optical measurement system as recited in claim 6, wherein the fine vibrator is formed with a piezoelectric material.

* * * * *